United States Patent [19]

de Jong

[11] 4,358,954
[45] Nov. 16, 1982

[54] TRAVELING WAVE FLOW METER

[75] Inventor: Joannes N. M. de Jong, West Ford, Mass.

[73] Assignee: Sperry Corporation, New York, N.Y.

[21] Appl. No.: 210,088

[22] Filed: Nov. 24, 1980

[51] Int. Cl.³ .............................................. G01F 3/20
[52] U.S. Cl. .................................... 73/269; 73/861.21
[58] Field of Search ............... 73/861.18, 861.21, 269, 73/262

[56] References Cited

U.S. PATENT DOCUMENTS

| 398,013 | 2/1889 | Welker | 73/269 |
| 3,015,953 | 1/1962 | Peltola | 73/861.21 |
| 4,141,246 | 2/1979 | Randolph | 73/861.21 |

*Primary Examiner*—Charles A. Ruehl
*Attorney, Agent, or Firm*—Howard P. Terry

[57] ABSTRACT

A traveling wave flow meter having a generally wave shaped member which is fabricated from a flexible material and which is disposed within a channel for conducting fluid. The flexible member undulates in response to a flow of fluid through the channel, and the frequency of the undulating flexible member is a function of the volumetric flow rate of the fluid.

5 Claims, 5 Drawing Figures

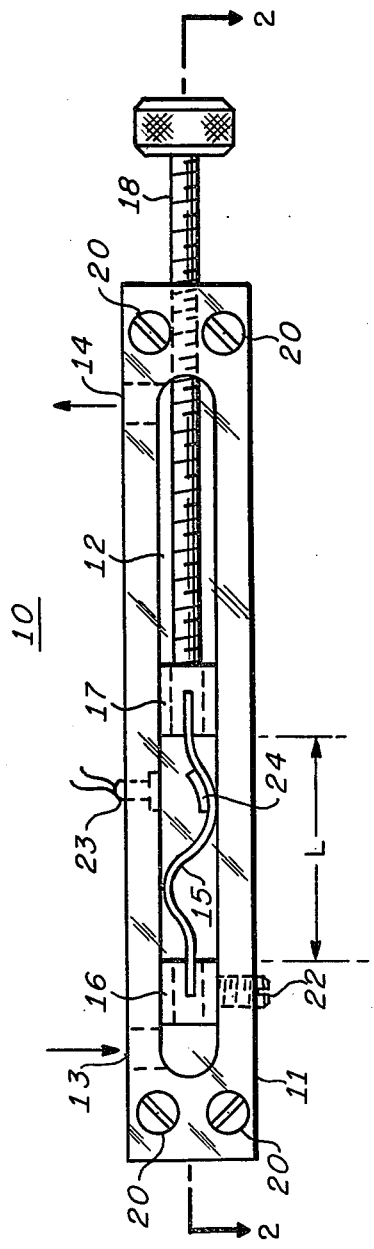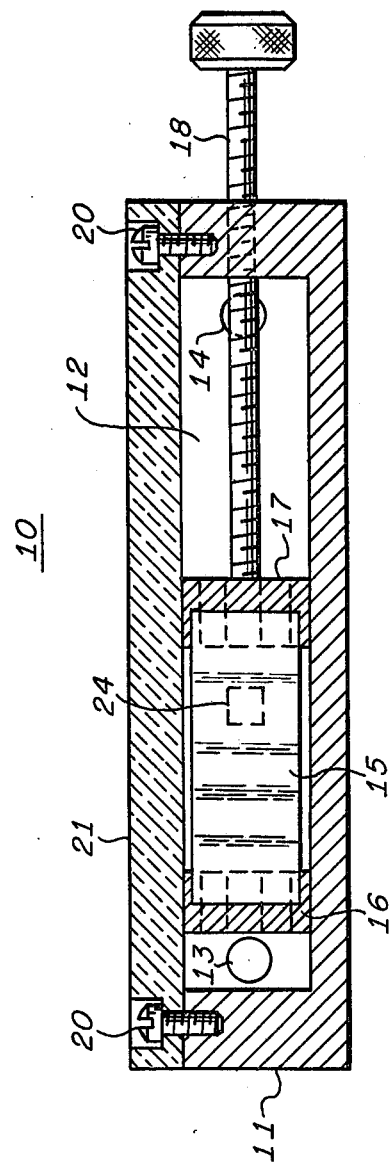

TRAVELING WAVE FLOW METER

BACKGROUND OF THE INVENTION

1. Field of the Invention

This invention relates to devices for measuring flow rates, and more specifically to a flow meter having an undulating flexible membrane whose frequency is a function of volumetric flow.

2. Description of the Prior Art

The monolithic microprocessor has revolutionized process control technology, but it has not yet found widespread application in practical electrohydraulic systems. Heretofore, an obstacle to microprocessor controlled electrohydraulic systems was the absence of an inexpensive flow meter which would easily interface with digital logic.

One attempt to interface a flow meter with digital logic is described in U.S. Pat. No. 4,033,188, issued July 5, 1977, entitled "Linear Vortex-Type Flowmeter," which discloses an electronic data processing system for a vortex-type flowmeter wherein the fluid to be measured is directed past a vortex-producing element to induce fluidic variations whose frequency is a function of flow rate. These variations are detected by a sensor yielding a signal having an A-C component whose frequency represents the uncorrected flow rate and a D-C component magnitude represents the temperature of the fluid. In order to correct for the effect of temperature on the accuracy of the reading, the signal components are separated from each other and converted into corresponding digital values which are fed into the data processing system to which are also applied digital values representing the fluid characteristics, the system producing an output signal representing the true flow rate.

The above-described system is inherently analog and requires relatively complex electronic circuitry to interface with the digital circuitry associated with the microprocessor. Moreover, the system is sensitive to temperature variations which must be corrected. Accordingly, there is a need for a more simple and less expensive flow meter which is well adapted for digital logic interfacing.

SUMMARY OF THE INVENTION

The apparatus of the present invention provides an inexpensive flow meter which can be easily interfaced with a microprocessor and which is substantially insensitive to temperature variations. The flow meter includes a strip of flexible material having a length X which is forced to occupy a length of channel L, wherein (L<X). As a result, the flexible material buckles and assumes a wavelike shape inside the channel. When fluid is forced to flow through the channel, the flexible material undulates in a traveling wave type of displacement and the frequency of the traveling wave is a function of the volumetric flow rate of the fluid through the channel.

BRIEF DESCRIPTION OF THE DRAWINGS

FIG. 1 is a plan view of the apparatus of the present invention;

FIG. 2 is a sectional front view of the apparatus of the present invention;

DESCRIPTION OF THE PREFERRED EMBODIMENT

Figure 3A:
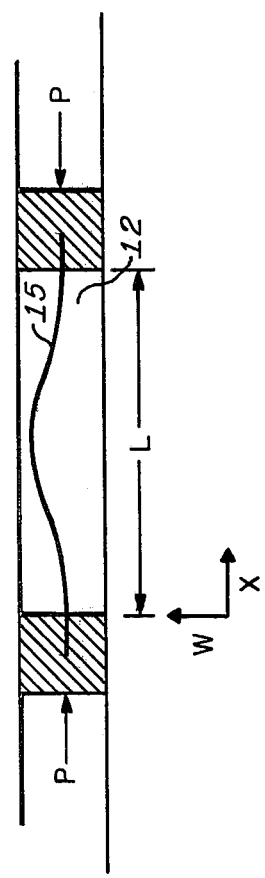
FIGS. 3A and 3B are theoretical wave shapes for the flexible member associated with the present invention.

Referring now to FIGS. 1 and 2, plan and sectional front views of a flow meter 10 are provided. The flow meter 10 includes a housing 11 and a channel 12 which is formed therein. Preferably, the housing 11 is made of aluminum bar stock or other suitable material and is sealed with a cover 21 which is made of plexiglass or other suitable material. The transparent cover 21 is secured by screws 20 which are threaded into the housing 11. The generally rectangular channel 12 is approximately 8" in length and includes an inlet 13 and an outlet 14 through which a continuous flow of fluid may be conducted. Disposed within the channel 12 is a flexible membrane 15 of a predetermined length X which is forced to occupy a predetermined length L of a portion of channel 12. The flexible member 15 is preferably fabricated from Mylar or other suitable polymer, or it may be fabricated from a beryllium copper compound or other suitable metal. Typically, the flexible membrane 15 would have dimensions of approximately 0.005 inch thick, 13/16 inch wide, and 3 inches long. Moreover, the flexible member 15 should be accurately dimensioned in width such that there is adequate clearance for free movement of the flexible membrane 15 inside the channel without excessive leakage flow. Forcing the flexible membrane 15 to assume length L in a portion of channel 12 results in a buckling of the flexible membrane 15 which is hereinafter described in greater detail.

In the preferred embodiment of the invention, the ends of the flexible member 15 are illustrated as being held by membrane holders 16, 17 through the use of clamps, epoxy or a tongue and groove type of arrangement. The membrane holders 16, 17 are slotted to allow the passage of fluid along the flexible membrane 15. A lead screw 18 may be threaded through the housing 11 and coupled to the membrane holder 17, such that the distance L between the membrane holders 16, 17 may be precisely adjusted. A set screw 22 may be threaded through the housing 11 to secure the membrane holder 16 within the channel 12. It should be noted, however, that in further embodiments of the present invention the ends of flexible membrane may be either free or hinged. An optical detector comprised of a light source and a photodetector is disposed within the housing 11 to detect the displacement of the flexible membrane 15 which is either made from a retroreflective material or includes a retroreflective strip 24 affixed to the flexible membrane 15. In further embodiments of the invention, the optical detector 23 may be replaced by other types of detecting devices, e.g., pressure transducers, strain gauges, piezoelectric strain gauges, thermistors, capacitance devices, or electromagnetic force pick-up devices. Alternatively, the flexible membrane 15 itself could be fashioned from a piezoelectric material, and an output signal indicative of the frequency of the flexible membrane could be derived. In the preferred embodiment, however, the retroreflective strip 24 causes a pulsed output signal each time the flexible membrane 15 and the retroreflective strip pass the optical detector 23, thereby providing an indication of the frequency of the traveling wave associated with the undulating flexible membrane 15.

Figure 3B:
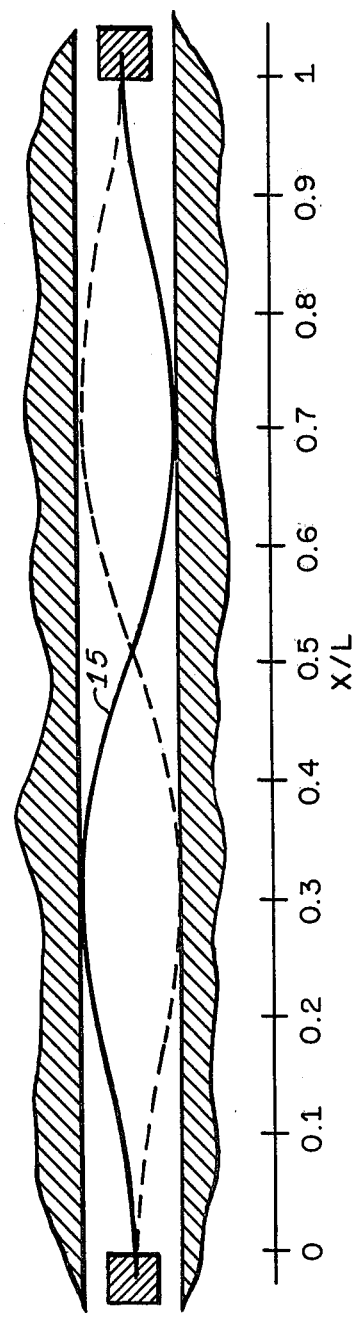

Referring now to FIGS. 3A and 3B, theoretical wave shapes for the flexible membrane 15 are depicted therein. The theoretical wave shapes may be achieved through mathematical modeling. For example, the shape of the flexible membrane 15 inside the channel 12 can be determined by solving the differential equations that model the buckling of beams or columns, i.e., $$\frac{d^4w}{dx^4} + k^2 \frac{d^2w}{dx^2} = 0 \tag{1}$$

where $k^2 = P/EI$, $P$ = the buckling force applied to the membrane, $E$ = Young's modulus, $I$ = the moment of inertia of the membrane's cross-section, $L$ = length, $W$ = displacement. The conditions which are illustrated in FIG. 3A and which are defined by the aforementioned equation (1) are based upon the assumptions that the deflections are small and that the membrane follows Hook's law. A general solution that satisfies the above-listed differential equation is given by $$w = C_1 \sin kx + C_2 \cos kx + C_3 x + C_4 \tag{2}$$

with the following boundary conditions:

$$\frac{dw}{dx} = 0 \text{ and } w = 0 \text{ at } x = 0 \text{ and } x = L \tag{3}$$

Substituting the boundary conditions (3) in the solution (2) yields $$C_4 = -C_2 \tag{4a}$$

$$C_3 = -kC_1 \tag{4b}$$

$$C_1(\cos kL - 1) - C_2 \sin kL = 0 \tag{4c}$$

$$C_1(\sin kL - kL) + C_2(\cos kL - 1) = 0 \tag{4d}$$

Eliminating $C_1$ from the last two equations and simplification yields $$C_2 \sin \frac{kL}{2} \left( \sin \frac{kL}{2} - \frac{kL}{2} \cos \frac{kL}{2} \right) = 0 \tag{5}$$

A first possible solution is provided when $\sin(kL/2) = 0 \rightarrow (kL/2) = n\pi$ and where $n = 1, 2, 3$. The buckling load becomes:

$$P_n = \frac{4n^2 \pi^2 EI}{L^2}$$

For $n = 1$, the smallest buckling load becomes $$P_1 = \frac{4 \pi^2 EI}{L^2}$$

and the shape of the membrane becomes:

$$w = C_2 \left( 1 - \cos \frac{2\pi x}{L} \right)$$

The constant $C_2$ cannot be determined but is chosen such that the membrane just touches the wall of the channel as shown in FIG. 3a. Obviously, the solution illustrated in FIG. 3a for the lowest buckling load is not a practical wave shape since there will always be a leakage path through the flow meter along the wall of channel 12 which is not in contact with the flexible membrane 15. A second solution is provided when:

$$\sin \frac{kL}{2} - \frac{kL}{2} \cos \frac{kL}{2} = 0$$

$$tg \frac{kL}{2} = \frac{kL}{2}$$

The smallest root of the above equation is:

$$(kL/2) = 4.493$$

which yields a buckling load of $$P = \frac{80.64 EI}{L^2}$$

This buckling load is larger than the smallest buckling load ($n=1$) associated with the first solution but is smaller than the $n=2$ solution. This indicates that if the load is gradually increased, the membrane will assume a cosine shape from the first solution and then the membrane will assume the shape associated with the second solution. This shape can be obtained through eliminating $C_4$, $C_3$, $C_2$ from Equation (4) and substituting those in Equation (2) yielding $$w = C_1 \left[ \sin kx + \frac{\cos kL - 1}{\sin kL} (\cos kx - 1) - Kx \right]$$

Considerable simplifications will finally yield $$w = C_1 \left[ -\sqrt{1 + \left(\frac{kL}{2}\right)^2} \sin k\left(x - \frac{L}{2}\right) - k\left(x - \frac{L}{2}\right) \right] \text{ or} \tag{6}$$

$$w = C_1 \left[ -\sqrt{1 + \left(\frac{kL}{2}\right)^2} \sin \frac{kL}{2}\left(\frac{2x}{L} - 1\right) - \frac{kL}{2}\left(\frac{2x}{L} - 1\right) \right]$$

The above solution consists of the sum of a straight line and a sine wave with a period of $kL/2\pi = 0.7$. Equation (6) is graphically depicted in FIG. 3b. Equation (6) also provides a predetermination of where the membrane touches the wall, i.e., when $dw/dx$ vanishes, and this occurs when $x/L = 0.3$ and $x/L = 0.7$. The second derivative $d^2x/dx^2$ is proportional to a moment which may be expressed by the following relationship:

$$M = EI \frac{dw^2}{dx^2} \quad (7)$$

Computing this second derivative, it is found that the moment vanishes at $x/L=0.15$, $x/L=0.5$, and $x/L=0.85$. The third derivative determines that the moment reaches a maximum at $x/L=0.32$ and $x/L=0.67$. The value of this maximum moment can be computed by substituting these values of $x/L$ in equation (7). Accordingly, it can be appreciated that the flexible membrane 15 can be caused to deform in accordance with the mathematical relationships described above when a buckling load is applied to the membrane.

When a fluid is forced through the channel 12, a wave results and the flexible membrane 15 buckles or undulates from its initial shape to a second shape having a 180° difference in phase. During the 180° phase change a volume of fluid is displaced and a relationship between volumetric flow rate Q and the frequency f of the traveling wave associated with the undulating flexible membrane 15 may also be achieved through mathematical modeling. The fluid flows through the channel with an average velocity $V_{ave}$. Since the traveling wave flow meter is a positive displacement type flow meter, the wave velocity equals the average fluid velocity, and the frequency of the wave can be expressed as $f=(V_{ave}/\lambda)$, where $\lambda$=wavelength, $V_{ave}$=average fluid velocity, and f=frequency of the wave. The average velocity is related to the volumetric flow rate by the equation $V_{ave}=(Q/A)$, where Q=volumetric flow rate and A=the cross-sectional area of the channel 12. Hence, the frequency of the traveling wave can be expressed as $f=(Q/A\lambda)$.

In operation, therefore, the flow meter 10 utilizes the frequency of the flexible member 15 in order to determine the volumetric flow rate Q. Referring back to FIG. 1, it can be appreciated that a continuous flow of fluid may be conducted into the channel 12 through the inlet 13. The incoming fluid is conducted through the slotted passages in the membrane holder 16 and flows along the flexible membrane 15, thereby causing it to undulate. The fluid is conducted through the slotted passages in membrane holder 17 and conducted out of the channel 12 via the outlet 14. As the flexible member 15 undulates between a first wave shape and a second wave shape having a 180° phase difference, the retroreflective strip 24 passes back and forth in front of the optical detector 23, thereby providing a pulsed output signal indicative of the frequency of the undulating flexible member 15. The pulsed output signal can be readily applied to a digital electronic processing means such as a counter coupled to a microprocessor to determine the volumetric flow rate in accordance with the algorithms described above.

Figure 4:
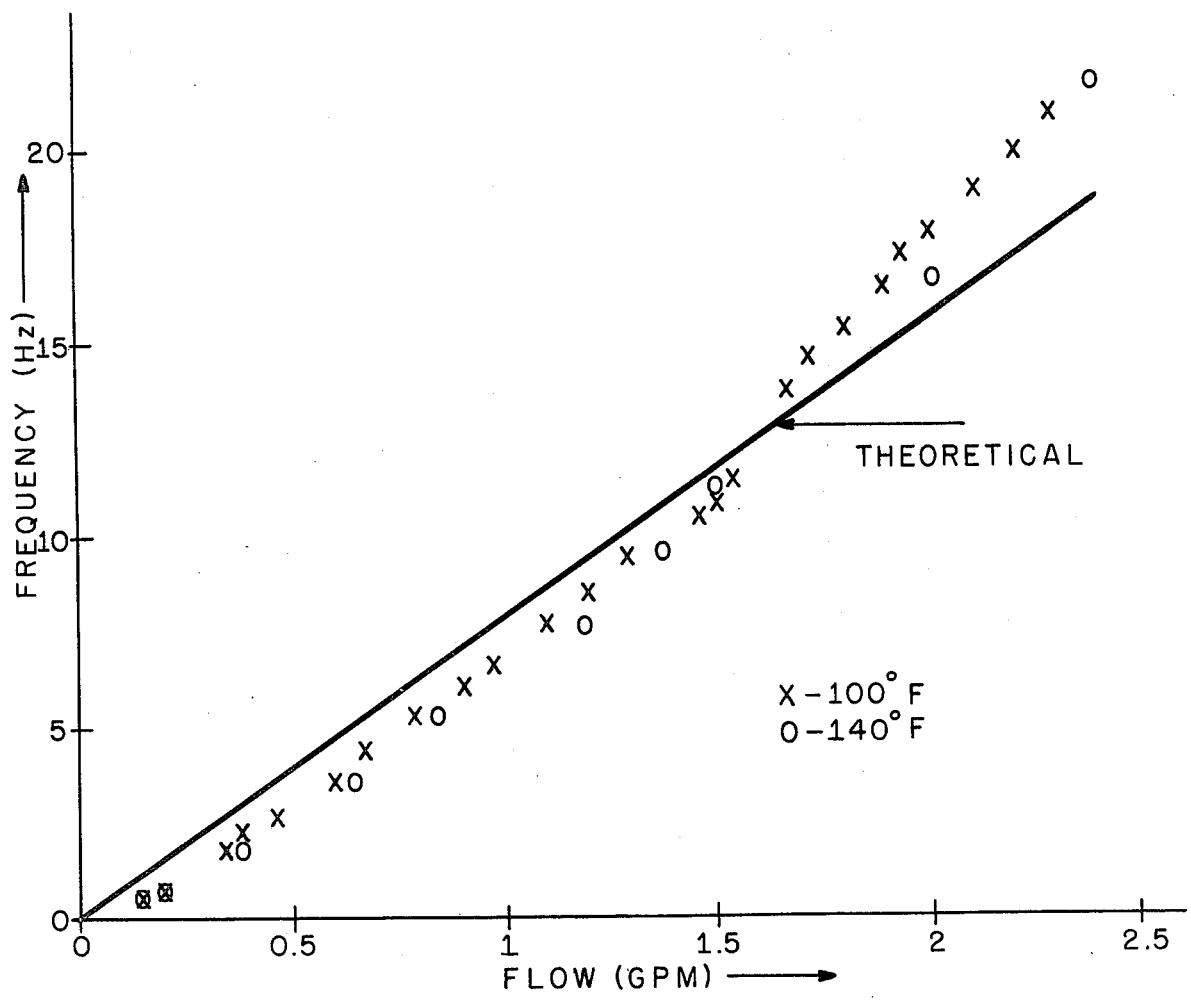
FIG. 4 is a graph of the traveling wave frequency as a function of flow rate.

Referring now to FIG. 4, a graphic representation of the frequency of the flexible membrane 15 is plotted as a function of the flow rate of oil through the flow meter 10. In experiments, the oil flow rate was varied from zero to approximately 2.5 gpm at a temperature of 100° F. and 140° F., and the frequency of the traveling wave was measured. It can be appreciated that experimental results conformed well to theoretical expectations.

Moreover, it should be noted that the positive displacement nature of the traveling wave flow meter 10 suggests that it is substantially insensitive to temperature variations in the flowing fluids.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A positive displacement flow meter comprising:
   (A) means for conducting fluid, having at least first and second walls;
   (B) flexure means disposed longitudinally in said conducting means for undulating between said first and second walls of said conducting means in response to fluid flow within said conducting means, said flexure means having:
      (1) a wavelike strip of flexible material of length X which is forced to occupy a length L, wherein $L<X$,
      (2) means for holding at least one end of said flexible strip, and
      (3) means for adjusting said holding means within said conducting means;
   (C) means for detecting the frequency of said flexible strip as it undulates between said first and second walls.

2. A positive displacement flow meter comprising:
   (A) means for conducting fluid, having at least first and second walls;
   (B) flexure means disposed longitudinally in said conducting means for undulating between said first and second walls of said conducting means in response to fluid flow within said conducting means, said flexure means having:
      (1) a wavelike strip of flexible material having a shape comprised of at least one full wave,
      (2) means for holding at least one end of said flexible strip, and
      (3) means for adjusting said holding means within said conducting means;
   (C) means for detecting the frequency of said flexible strip as it undulates between said first and second walls.

3. An apparatus according to claim 1 or 2 wherein said holding means includes a plurality of passages for fluid flow.

4. An apparatus according to claim 1 or 2 wherein said conducting means includes a channel having a cover and having inlet and outlet means.

5. An apparatus according to claim 1 or 2 wherein said frequency detecting means comprises a reflector incorporated into said flexure means, a light source for illuminating said reflector, and a photodetector responsive to said reflector, disposed so that said frequency is derived from an output signal produced by light originating from said source that is reflected from said reflector to said photodetector as said flexible strip undulates.

* * * * *